US012668034B2

(12) United States Patent
Lecompere et al.

(10) Patent No.: US 12,668,034 B2
(45) Date of Patent: Jun. 30, 2026

(54) CONCEALING NON-OPTICALLY TRANSPARENT COMPONENTS OF OPTICAL ARTICLES

(71) Applicant: Essilor International, Charenton-le-Pont (FR)

(72) Inventors: Maxime Lecompere, Charenton-le-Pont (FR); Mathieu Feuillade, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 771 days.

(21) Appl. No.: 17/760,489

(22) PCT Filed: Feb. 10, 2021

(86) PCT No.: PCT/EP2021/053115
§ 371 (c)(1),
(2) Date: Aug. 10, 2022

(87) PCT Pub. No.: WO2021/160624
PCT Pub. Date: Aug. 19, 2021

(65) Prior Publication Data
US 2023/0083247 A1    Mar. 16, 2023

(30)     Foreign Application Priority Data

Feb. 12, 2020    (EP) ..................................... 20305129

(51) Int. Cl.
*B29D 11/00*          (2006.01)
*G02C 7/02*           (2006.01)
(52) U.S. Cl.
CPC .......... *B29D 11/00865* (2013.01); *G02C 7/02* (2013.01); *B29K 2995/0025* (2013.01)

(58) Field of Classification Search
CPC ........ B29D 11/00865; B29D 11/00807; B29D 11/00923; B29D 11/00009; B29D 11/00;
(Continued)

(56)                References Cited

U.S. PATENT DOCUMENTS 6,505,935 B2 *   1/2003   Ayoub ...................... B24B 9/14
                                                         351/44
6,786,596 B1     9/2004   Ayoub
(Continued)

FOREIGN PATENT DOCUMENTS

CN           1455884 A      11/2003
CN         104044287 A       9/2014
(Continued)

OTHER PUBLICATIONS

Chinese Office action issued Feb. 23, 2024 in corresponding Chinese Application No. 202180012040.6 (with English translation), 14 pages.
(Continued)

*Primary Examiner* — William R Alexander
*Assistant Examiner* — Gabriel A Sanz
(74) *Attorney, Agent, or Firm* — Oblon, McClelland, Maier & Neustadt, L.L.P.

(57)                ABSTRACT

The disclosure relates to a method of concealing a non-optically transparent component of an optical article. The method comprises—providing (S7) an optical article comprising: —an optical lens comprising an eyeball side facing an eye of a person when the optical article is worn by the person and an object side opposing the eyeball side, the optical lens comprising on the object side an eyewear shape section extending from an outer contour of the optical lens to an inner contour, and—a non-optically transparent component extending at least partly over the eyewear shape section, and—concealing (S8) the non-optically transparent
(Continued)

component by covering at least part of the eyewear shape section of the optical lens using an opaque material.

12 Claims, 2 Drawing Sheets

(58) Field of Classification Search
CPC .......... G02C 7/02; G02C 7/021; G02C 7/022; B29K 2995/0025; B33Y 80/00
See application file for complete search history.

(56) References Cited

U.S. PATENT DOCUMENTS

| | | | |
|---|---|---|---|
| 9,851,584 B2 | 12/2017 | Luderich et al. | |
| 2012/0013841 A1 | 1/2012 | Montsaroff | |
| 2012/0081659 A1 | 4/2012 | Matsui | |
| 2012/0127420 A1 | 5/2012 | Blum et al. | |
| 2016/0266403 A1 | 9/2016 | Duis et al. | |
| 2016/0299360 A1* | 10/2016 | Fonte | G02C 7/027 |
| 2016/0306187 A1 | 10/2016 | Luderich et al. | |
| 2017/0299886 A1 | 10/2017 | Carmon et al. | |
| 2018/0133989 A1* | 5/2018 | Nagao | B29D 11/00442 |
| 2020/0400952 A1* | 12/2020 | Jenkins | G02B 5/005 |
| 2021/0011308 A1 | 1/2021 | Luderich et al. | |
| 2021/0046718 A1 | 2/2021 | Tan et al. | |

FOREIGN PATENT DOCUMENTS

| | | |
|---|---|---|
| CN | 106104365 A | 11/2016 |
| CN | 106457705 A | 2/2017 |
| CN | 107405938 A | 11/2017 |
| CN | 108474965 A | 8/2018 |
| CN | 110095885 A | 8/2019 |
| DE | 10 2018 002 384 B3 | 3/2019 |
| WO | WO 2008/091896 A2 | 7/2008 |
| WO | WO 2012/068527 A2 | 5/2012 |
| WO | WO 2017/179014 A1 | 10/2017 |
| WO | WO 2018/007425 A1 | 1/2018 |
| WO | WO 2019/175360 A1 | 9/2019 |

OTHER PUBLICATIONS

International Search Report mailed on Apr. 6, 2021 in PCT/EP2021/053115 filed on Feb. 10, 2021 (5 pages).
Written Opinion mailed on Apr. 6, 2021 in PCT/EP2021/053115 filed on Feb. 10, 2021 (10 pages).

* cited by examiner

CONCEALING NON-OPTICALLY TRANSPARENT COMPONENTS OF OPTICAL ARTICLES

FIELD OF THE INVENTION

The present invention relates in general to optical articles, and in particular, to methods, computer programs, computer storage media and systems for concealing non-optically transparent components of optical articles, and to optical articles having a concealed non-optically transparent component.

BACKGROUND OF THE INVENTION

Designing smart eyewear, for instance eyewear integrating sensors or other electronic components is complex.

In order to provide some types of smart functions, it is desirable to design the smart eyewear to comprise some electronic components positioned in a frontal part of the eyewear. This way, when the smart eyewear is worn by a wearer, the electronic components are positioned with respect to the face of the wearer in such a way to provide the expected smart function.

For example, a smart eyewear may be a pair of spectacle lenses mounted on a spectacle frame, the spectacle frame comprising rims connected to each other by a bridge, each rim being connected to a temple by a hinge. The smart eyewear may further be equipped with light sensors positioned on the rims of both optical lenses so that when the smart eyewear is worn by the wearer, both light sensors may measure light intensity in a region close to a corresponding eye of the wearer. The smart eyewear may further be equipped with a battery for powering the sensors. The battery may be inserted in a temple and connected to the sensors by electrical wiring passing through said temple, both rims and the bridge.

Depending on the type of smart function and on the nature of the components for providing said smart function, the positioning of the components may be detrimental to eyewear estheticism since components may thus be visible by the wearer and/or by other persons.

In order to alleviate this issue, a known possibility is to hide the components within the thickness of the spectacle frame.

However, this possibility often requires designing a specific spectacle frame to include said components. The choice of possible eyewear is thus limited. Another drawback is that the available options for eyewear customization may be restricted, for example to additive manufacturing technologies for instance.

For instance, to connect a battery in a right temple to sensor in a left temple, wiring may be used inside the spectacle frame, and in this case the rims need to allow both holding the lens and integrating wiring. The connection of the lens with the eyewear is complex and is generally done on the lens periphery, using specific contact, or using wiring.

In this context, there is a need to be able to determine optical articles that may integrate non-optically transparent components (such as active components), the integration not being detrimental to eyewear estheticism or being restricted to specific spectacle frames.

SUMMARY OF THE INVENTION

Embodiments of the invention provide a method of concealing a non-optically transparent component of an optical article, the method comprising:

providing an optical article comprising:
an optical lens comprising an eyeball side facing an eye of a person when the optical article is worn by the person and an object side opposing the eyeball side, the optical lens comprising on the object side an eyewear shape section extending from an outer contour of the optical lens to an inner contour, and
a non-optically transparent component extending at least partly over the eyewear shape section, and
concealing the non-optically transparent component by covering at least part of the eyewear shape section of the optical lens using an opaque material.

Embodiments of the invention further provide a computer program comprising one or more stored sequence/s of instructions that is accessible to a processor and which, when executed by the processor, causes the processor to carry out the steps of the above method.

Embodiments of the invention further provide a storage medium storing one or more stored sequence/s of instructions of the above computer program.

Embodiments of the invention further provide a processing circuit comprising a processor connected to a memory and to a communication interface with a concealing device, the processing circuit being configured to implement the above method by instructing the concealing device to cover at least part of an eyewear shape section of an optical lens of the optical article using an opaque material The methods, computer programs, storage media and systems above allow concealing the non-optically transparent component, which corresponds more generally to integrating the component in the eyewear without aesthetical compromise. As a result, optical articles may be manufactured to integrate non-optically transparent components (such as active components), this integration not being detrimental to eyewear estheticism or restricted to specific spectacle frames.

Embodiments of the invention further provide an optical article comprising:

an optical lens comprising an eyeball side facing an eye of a person when the optical article is worn by the person and an object side opposing the eyeball side, the optical lens comprising on the object side an eyewear shape section extending from an outer contour of the optical lens to an inner contour, and
a non-optically transparent component extending at least partly over the eyewear shape section,
wherein at least part of the eyewear shape section of the optical lens is covered with opaque material such that the non-optically transparent component is concealed.

The optical articles above comprise an integrated non-optically transparent component that is concealed, therefore masked or blended in its surroundings so as not to attract undesired attention.

A "non-optically transparent" component is interpreted as having at least a physical portion which optical properties are different from being see-through or clear.

In other words, visible light cannot pass through a non-optically transparent component undisturbed. Examples of non-optically transparent components include translucent, opaque or reflective components.

The component "extending at least partly over the eyewear shape section" is interpreted so that at least part of the component faces at least a part of the eyewear shape section. The part of the eyewear shape section which the component extends over is hereafter referred to as the "component section". The part of the eyewear shape section neighboring the component section is hereafter referred to as the "neighboring section".

In an embodiment, the component is an active component and the optical article further comprises an active device comprising said active component.

Since an active component needs to be connected to a power source by a wiring, and since the active component, the wiring and the power source are generally non-transparent, active devices are generally fully integrated in eyeglass frames so as not to hinder the visual field as well as aesthetics. These drawbacks are here overcome.

The visual field is minimally restricted because the active component extends only over the periphery of the lens (outside the inner contour). Aesthetics are preserved due to the concealing.

In an embodiment, the eyewear shape section comprises a component section being the part of the eyewear shape section faced by the non-optically transparent component upon concealing, and a neighboring section neighboring the component section, and wherein:

covering at least part of the eyewear shape section of the optical lens using an opaque material comprises covering the component section using said opaque material.

By doing so, the component is masked and cannot be seen by an observer viewing the object side of the optical lens.

In an embodiment, the eyewear shape section comprises a component section being the part of the eyewear shape section faced by the non-optically transparent component upon concealing, and a neighboring section neighboring the component section, and wherein:

covering at least part of the eyewear shape section of the optical lens using an opaque material comprises covering the neighboring section using said opaque material while keeping the component section uncovered by said opaque material.

Concealing the non-optically transparent component may include keeping the component section transparent and uncovered while covering the neighboring section. In this case, the covering shall be performed with an opaque material that has a substantially similar visual appearance as the component. By doing so, the component is blended in its surroundings so as to be less distinguishable from the neighboring section by an observer viewing the object side of the optical lens.

In an embodiment, upon concealing the non-optically transparent component, the optical lens is contiguous to the component.

Electronic components can be arranged in a specific spatial position using guides to hold the components in place during a lens manufacturing process. The guide can be removed next, leaving the electronic components at the right place with respect to the lens, these components being then hidden, covered with the opaque material.

In an embodiment, upon concealing the non-optically transparent component, the component is at least partly encapsulated in the optical lens.

The component can be embedded within the lens during an additive manufacturing process. Wires batteries, microfluidic channels, etc, can be for example incorporated using classical polymer jetting or SLA manufacturing methods. Also, microfluidic channels can be manufactured with a bicomponent system, one component being the durable lens material, the second material being removable to open the channels after lens manufacturing. The created channels, as non-optically transparent components, may be hidden behind a decoration out of opaque material.

In an embodiment, upon concealing the non-optically transparent component, the optical lens extends beyond the outer contour of the optical lens.

An optical lens extending beyond the outer contour may be a non-edged lens. Indeed, concealing may occur at any of the different stages of manufacturing an optical lens. The optical lens obtained as a result may be a non-edged lens, for example a semi-finished lens. Concealing may also be performed on a finished lens including a bridge as part of the lens, such that the bridge part extends beyond the outer contour of the optical lens.

In an embodiment, upon concealing the non-optically transparent component, the optical lens is shaped to match the outer contour.

As mentioned above, concealing may occur at any of the different stages of manufacturing an optical lens. The optical lens obtained as a result may be an edged lens, a finished lens, etc. The optical article may further comprise an eyeglass frame in which the optical lens is mounted.

In an embodiment, the method further comprises, prior to obtaining the optical article, manufacturing the optical article by:

obtaining said eyewear shape extending from an outer contour to an inner contour, manufacturing said optical lens, and positioning said non-optically transparent component based on said eyewear shape so that said non-optically transparent component extends at least partly over the eyewear shape section.

Manufacturing said optical lens may be performed either before or after positioning said non-optically transparent component.

In an embodiment, the method further comprises, after positioning said non-optically transparent component, at least partly encapsulating said non-optically transparent component in the optical lens.

In an embodiment, the method further comprises:

obtaining lens characteristics, obtaining a semifinished lens blank based on said lens characteristics, and said optical lens is manufactured starting from said semifinished lens blank.

Lens characteristics may comprise for example an optical design, a prescription value, a preference of a given person . . . so as to allow providing an optical equipment meeting individual needs.

In an embodiment, the method further comprises selecting a pattern among a plurality of patterns, and covering at least part of the eyewear shape section of the optical lens using an opaque material is performed according to the selected pattern.

It is thus possible to customize eyewear playing on a choice of decorative patterns.

In an embodiment, the method further comprises selecting an eyewear shape section among a plurality of eyewear shape sections, and wherein:

the eyewear shape section of the provided optical article is the selected eyewear shape section.

In an embodiment, the method further comprises obtaining a customized eyewear shape comprising a customized eyewear shape section, and wherein:

the eyewear shape section of the provided optical article is the customized eyewear shape section.

Both embodiments above allow removing the need to create a specific eyewear frame for component integration.

The eyewear shape is at least 2D shape of the eyewear (but can include also 3D shape, eyewear curvature for instance, or thickness in Z axis . . . ).

In an embodiment, the opaque material is ink and covering at least part of the eyewear shape section of the optical lens is performed by inkjet printing.

Alternately, the opaque material may be in the form of a thin layer which is applied onto the at least part of the eyewear shape section of the optical lens.

Optionally, prior to coating, the at least part of the eyewear shape section may be subjected to a surface treatment which may include additive manufacturing (such as material depositing) and/or subtractive manufacturing (such as etching). The surface treatment may improve adhesion between the opaque material and the lens.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1:
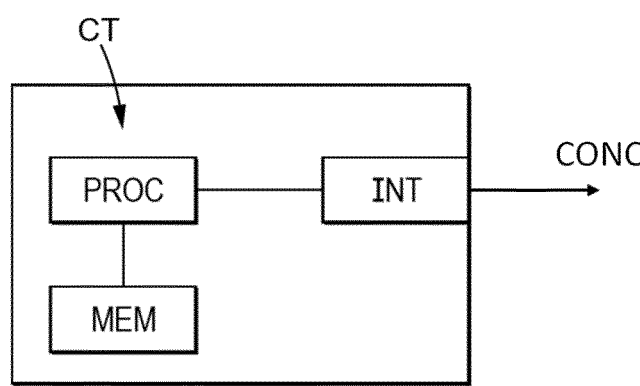
FIG. 1 depicts an example of a computer system adapted for implementing a method according to an embodiment of the invention.

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a system and conversely, all the technical features relative to a system can be transposed, individually or in combination, to a process.

It is now referred to [FIG. 1], which depicts a computer system according to an embodiment of the invention. The computer system comprises a centralized treatment unit (CT), comprising a processor (PROC) operably connected to a memory (MEM) and to a communication interface (INT) with a concealing unit (CONC). The concealing unit (CONC) is configured to cover at least part of an eyewear shape section of an optical lens using an opaque material, upon receiving from the centralized treatment unit an instruction to do so.

Figure 2:
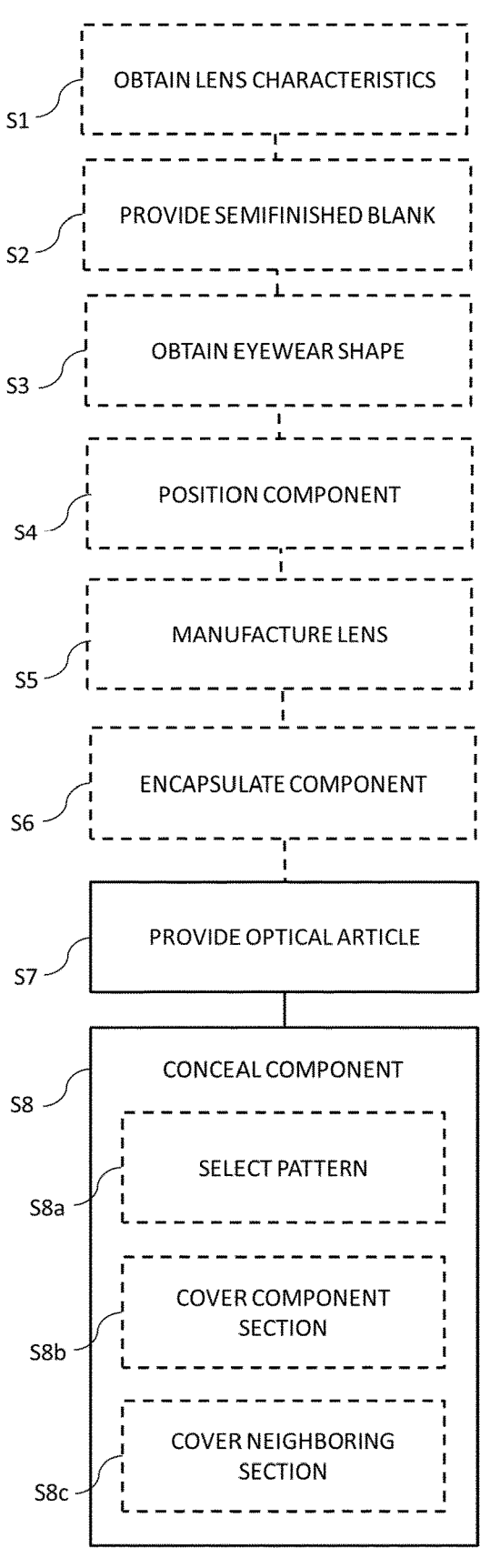
FIG. 2 depicts a flowchart of a general algorithm of a computer program for performing a method according to an embodiment of the invention.

It is now referred to [FIG. 2], which depicts a general algorithm of a computer program according to an embodiment of the invention. The computer program may be stored on the memory (MEM) to be executed by the processor (PROC).

The centralized treatment unit (CT) obtains [OBTAIN LENS CHARACTERISTICS (S1)] at least one characteristic of an optical lens.

A "characteristic" may correspond to an optical function, a dioptric function, an optical design, . . . . If the optical lens is a prescription lens for correcting an ametropia of a wearer, examples of dioptric functions may include a sphere power corresponding to a prescription value, a cylinder power, an axis, a prism, etc. . . . .

The optical lens can be of any type (single vision, progressive, multifocal . . . ) The lens power is generally given by the lens material and the shape of the lens surface, but can also be at least partially provided via an active function included in the lens.

Other characteristics of an optical lens may include transmission or tint (which corresponds to transmission of light as a function of wavelength). The characteristics lens may be indicative of different colors, of different transmission values, may be chosen for improving contrast, for reducing glare, for limiting polarization, . . . .

The lens transmission tint is generally provided via dye or pigment inside or at the surface of the lens material, or via mirror coating, but can also be at least partially provided via an active function in the lens.

For example, the characteristics of the optical lens may be chosen by a particular customer or determined by an eye care practitioner to correspond to the needs of the particular customer.

Based on the obtained characteristics, a semifinished optical lens blank is provided [PROVIDE SEMIFINISHED BLANK (S2)] (or selected, obtained, chosen, manufactured . . . ). An optical lens is to be manufactured from the provided semifinished optical lens blank and to be mounted on a spectacle frame to form an optical equipment. The semifinished optical lens blank comprises an eyeball side (or back surface) and an object side (or front surface). The eyeball side corresponds to the side that is to face an eye of a person when the optical equipment is worn by the person. The object side is defined as the side opposing the eyeball side.

The centralized treatment unit (CT) obtains a set of parameters indicative of the shape of the provided semifinished optical lens blank. For example, the set of parameters may be accessed from a database or determined by cropping a picture of the front surface of the provided semifinished optical lens blank. Various other possibilities to obtain such set of parameters are known from the skilled person.

The centralized treatment unit (CT) obtains [OBTAIN EYEWEAR SHAPE (S3)] an eyewear shape.

The eyewear shape may be a shape of an optical lens, such as a spectacle lens, to be obtained by edging the obtained semifinished lens blank. The optical lens to be obtained is monolithic and may include, in an embodiment, a first spectacle lens region, a second spectacle lens region and a bridge region connecting the first spectacle lens region to the second spectacle lens region.

The eyewear shape defines an eyewear shape section of the object side of the semifinished optical lens blank. The eyewear shape section comprises an outer contour, which corresponds to the shape of the optical lens to be manufactured from the semifinished optical lens blank. The eyewear shape section extends from the outer contour inwards to an inner contour.

The eyewear shape may be chosen by a particular customer among a catalogue of optical lens shapes or among a catalogue of optical equipments having optical lenses of different shapes. Alternately, the eyewear shape may be fully customized to fit the needs of a particular customer.

The eyewear shape, be it selected or customized, includes at least a 2D outer contour and may also include a 3D outer contour, an eyewear curvature, a lens thickness . . . .

A non-optically transparent component is further provided. In an embodiment, the non-optically transparent component is part of an active device, adapted to provide an active function, to be included in the optical equipment. The non-optically transparent component may itself be active. Many active functions can be provided. By active function is meant an optical or non-optical function that may require energy (electricity, light energy, mechanical energy . . . ) to work. The nature of the non-optically transparent component may be very broad. Various examples are provided hereinafter.

For example, the optical lens may be an electrochromic optical lens. An electrochromic optical lens comprises electrochromic cells which transmission or tint is an active function that may be controlled.

The electrochromic optical lens may be mounted in a spectacle frame. In order to control the electrochromic optical lens, the optical equipment may for example be further equipped with:

a battery as a power source, a light sensor for sensing light intensity in the environment of the optical equipment, an electronic board configured to drive the electrochromic lens based on the sensed light intensity, and wiring to connect the battery with the electronic board, the light sensor and the electrochromic lens.

The electrochromic cells do not provide visual field occultation, haze or visual discomfort to the wearer and may thus be positioned to be in the field of view of the wearer when the optical equipment is worn.

On the contrary, battery, electronic board, sensor and wiring are preferably positioned to be outside the field of vision of the wearer when the optical equipment is worn for being visually uncomfortable and not esthetical.

For example, the optical lens may be a variable power optical lens and may be mounted in a spectacle frame. Different known technologies may provide optical lenses having a variable power.

Liquid crystals (cholesteric crystals for instance) may be embedded within two conductive layers (ITO for instance) to adapt the refractive index and so change the lens power. For the same reasons as for electrochromic optical lenses described above, a battery, a sensor, wiring and an electronic board are necessary for providing a variable power optical lens wherein the power variation is based on driving liquid crystals.

Fluidic optical lenses may comprise a plurality of liquid substances each having a different refractive index. In this case, a pump may be used to move the liquid substances and provide a power variation to the optical lens. A battery and wiring should then be provided to activate the pump. The battery and the pump both shall be positioned to be outside the visual field of the wearer when the optical equipment is worn. Also, a channel system is needed to bring the fluids in an active area, corresponding to an area in the visual field of the wearer when the optical equipment is worn. If the channel system is positioned to be in the visual field of the wearer when the optical equipment is worn, the channel system might generate optical imperfections.

Other known variable power optical lenses, such as liquid dielectric optical lenses and Alvarez optical lenses, also require non-optically transparent components to be included or connected to the optical lens.

For example, the optical lens may include:

a sensor, for example to measure a light intensity (visible light, IR, UV blue . . . ), or a camera for filming the environment of the wearer, or a light source (for instance for eye tracking of the wearer, for phototherapy . . . )

It is also possible to include special chemical substances in or on the optical lens. For instance, one or more reservoirs may be incorporated inside the optical lens, each reservoir containing one or more chemical substances. Examples of chemical susbstances may include antibacterial substances, antifog substances, hydrophobic substances, antistatic substances, odorant substances, substances providing anti-scratch properties, magnetic substances . . . . These chemical substances may be provided towards the lens surface using miniature nozzle and actuators (such as those used in inkjet printing or aerosol jet printing for instance).

Some of these chemical substances are non-optically transparent. Some substances may exhibit a low transmission, haze, a specific color . . . . As a consequence, these chemical substances are not compliant with optical requirement and esthetics.

The provided non-optically transparent component may be positioned POSITION COMPONENT (S4) close to the optical lens to extend at least partly over the eyewear shape section of the optical lens.

A component section is defined as being the part of the eyewear shape section faced by the positioned non-optically transparent component.

A neighboring section is defined as being the part of the eyewear shape section neighboring the component section.

Generally, it is proposed to position non-optically transparent components that may or may not be active (sensor, wiring, battery, reservoir for chemical components, pump for fluidic lens, magnetic component for clip on attachment, anticounterfeiting component, circuit board, solar cell, . . . ) directly in or on the optical lens, close to the periphery of the optical lens. Other components like microfluidic systems, might be necessary to manufacture within the lenses to create auto-focus fluidic lenses. The channels and circulating fluids to the active area are manufactured to be transparent but some imperfections might still persist due to variation of refractive index between the fluid and the lens material.

In an embodiment, the non-optically transparent component is positioned close to the lens periphery, for example the non-optically transparent component extends no further than 1 cm from the edge of the optical lens, preferably no further than 0.7 cm. Such position is outside the visual field of the wearer when the optical equipment is worn.

The centralized treatment unit (CT) receives a position indicator of the component with respect to the optical lens. The position indicator may be received either after positioning the component or before positioning the component. In the latter case, the position indicator indicates a predetermined position, which the component is to be positioned at.

In an embodiment, a choice of an active function is provided to the centralized treatment unit according to the needs of a particular customer. At least one non-optically transparent component may be determined to provide the chosen active function. The non-optically transparent component may be positioned after the lens characteristics and the eyewear shape are obtained.

The centralized treatment unit (CT) may be configured to control a manufacturing unit which transforms the semifinished optical lens blank into a manufactured optical lens having a shape corresponding to the eyewear shape.

In other words, based on the obtained eyewear shape, an optical lens is manufactured [MANUFACTURE LENS (S5)] from the provided semifinished optical lens blank as base material. Manufacturing may be additive (adding material) or subtractive (removing material) or may include both additive and subtractive manufacturing steps in any order.

For example, the back surface of the semifinished optical lens blank may be surfaced to correspond to a desired prescription using a free form device. The surfaced lens may then be edged to the eyewear shape using for instance an edger (milling or grinding edger).

In an embodiment, before manufacturing the optical lens, the active component is already incorporated in the lens material. For example, the semifinished optical lens has a diameter larger than that of the optical lens to be manufactured, and includes at least one active component. In this case, the semifinished optical lens blank may be edged according to the obtained eyewear shape, taking into account the position of the incorporated active component so that the at least one active component is positioned in between the outer and inner contour forming the eyewear shape section. In addition, if the lens is plano, no surfacing is required and the manufactured optical lens is thus finished.

In an embodiment, the non-optically transparent component is positioned after manufacturing the optical lens. In this case, the centralized treatment unit may be configured for determining a position of the non-optically transparent component. For example determining said position may be based on the obtained eyewear shape. For example, determining said position may be based on determining an area between the outer contour and the inner contour, the dimensions of said area being suitable for positioning the non-optically transparent component.

It is for instance possible to position some component in the upper part of the contour, while positioning some other components in the lower part. It may also be possible to locate components all along the eyewear contour. It is so possible to decide the location of components in a customized way, as long as they are in between the outer-inner contour of the eyewear.

Electronic components can be arranged in a specific spatial position using guides to hold the components in place. The guide can be later removed, leaving the electronic components at the right place within the optical lens.

As an example of a possible embodiment, the optical lens may be mounted in a rim of a spectacle frame, the rim being connected to a temple by a hinge. A camera may be incorporated in the optical lens at a position close to the hinge. A battery may be incorporated in the temple, along with a electronic board to control the camera and transmit images to a terminal such as a smartphone. The camera, electronic board and battery may be linked to one another via wiring components.

In an embodiment, the position of the non-optically transparent component may be such that the component is at least partly encapsulated in the optical lens.

The centralized treatment unit (CT) may be configured to control a manufacturing unit to encapsulate ENCAPSULATE COMPONENT (S6) the component by additive and/ or subtractive manufacturing. Wires, batteries, microfluidic channels . . . can be incorporated using classical polymer jetting or aerosol jetting or SLA manufacturing methods. It is also possible that the optical lens comprises two cells, the non-optically transparent component being encapsulated between the two cells. It is also possible to configure the centralized treatment unit to control a polymer depositing unit to deposit polymer on the eyewear shape section to encapsulate or protect the non-optically transparent component. Also, microfluidic channels may be manufactured with a bicomponent system, one component being the durable lens material, the second material being removable to open the channels after lens manufacturing.

An optical article is provided PROVIDE OPTICAL ARTICLE (S7) to the concealing unit (CONC).

The optical article comprises an optical lens comprising an eyeball side facing an eye of a person when the optical article is worn by the person and an object side opposing the eyeball side, the optical lens comprising on the object side an eyewear shape section extending from an outer contour of the optical lens to an inner contour.

The optical article further comprises a non-optically transparent component either already extending at least partly over the eyewear shape section or to be positioned according to a predetermined position to extend at least partly over the eyewear shape section.

The provided optical article may correspond to any of the optical lenses above, at any stage of manufacturing.

After that:

the optical article is provided to the concealing unit (CONC), the eyewear shape of the optical lens is obtained by the centralized treatment unit (CT), and the position of the non-optically transparent component is obtained by the centralized treatment unit (CT), the centralized treatment unit controls the concealing unit to conceal CONCEAL COMPONENT (S8) the non-optically transparent component by covering at least part of the eyewear shape section of the optical lens with an opaque material.

Concealing may comprise printing or writing on the object side of the optical lens, along the eyewear shape, using for instance inkjet technology.

In an embodiment, a side effect of concealing is decorating the periphery of the optical lens to reproduce a pattern resembling a rim of a spectacle frame.

Instead of printing, it is possible, for example, to deposit an opaque printed film, or to dip the lens in a colored solution using a mask to protect the area of the optical lens not belonging to the eyewear shape section.

A pattern may be selected SELECT PATTERN (S8a) among a list of available patterns, or fully customized, and applied by the concealing unit to cover the at least part of the eyewear shape section of the optical lens. The pattern may comprise features such as color, texture, ornament, . . . . The pattern may extend to the bridge and/or to the endpiece of a spectacle frame.

The selected or customized pattern may have active properties and be controllable, or switchable, between at least two states.

To provide these active properties, the opaque material used to apply the selected pattern may be electro-responsive, thermo-responsive, photo-responsive, . . . and/or may have piezoelectric properties.

For example, an opaque material having piezoelectric properties may be used to provide a pattern transformable from a first state corresponding to a first visual appearance to a second state corresponding to a second visual appearance upon touching, or applying pressure to, the opaque material.

For example, a thermo-responsive opaque material may have a first state corresponding to a first visual appearance at an ambient temperature and a second state corresponding to a second visual appearance at a higher temperature. The thermo-responsive opaque material may be heated, for example by Joule effect, to switch from the first state to the second state.

Covering the at least part of the eyewear shape section may comprise covering COVER COMPONENT SECTION (S8b) the component section with the opaque material. Therefore, the non-optically transparent component is concealed by being covered by the opaque material covering the component section of the optical lens.

For example, an eyetracker only needs to be positioned to receive incoming light reflected by a pupil of the wearer when the optical equipment is worn. Therefore, an eyetracker incorporated in an optical lens of the optical article as a non-optically transparent component does not need to be visible from the object side of the optical lens. Therefore, it is possible to conceal the incorporated eyetracker simply by covering at least the component section with the opaque material.

Covering the at least part of the eyewear shape section may comprise covering COVER NEIGHBORING SECTION (S8c) the neighboring section with the opaque material.

For example, a camera may be incorporated in a recess of an optical lens of the optical article. In order to acquire images, the camera needs to be at least partially uncovered by opaque material. Therefore, it is possible to cover the neighboring section with the opaque material while keeping the component section clear. Preferably, it is possible to choose opaque material of a similar appearance (color, texture) as the camera. Therefore the camera is concealed by blending in the surrounding section covered by the opaque material and may acquire images.

In an embodiment, the non-optically transparent component may be provided, positioned and/or incorporated and simultaneously concealed.

For example, the non-optically transparent component may be wiring. It is possible by inkjet or aerosol jet technology to print the wiring directly on the object-side or on the eyeball-side of the optical lens using conductive ink.

The wiring may thus be printed and concealed either at the same time or sequentially using different printing techniques and/or different inks.

More generally, depending on the nature and location of components to be encapsulated, created and concealed, different manufacturing technologies may be successively used or simultaneously combined to manufacture the eyewear comprising the concealed component.

Concealing a non-optically transparent component as described in the above embodiments permits a very easy integration of the component in the eyewear without esthetical compromise:

no need to create specific eyewear frame for component integration, possibility to customize eyewear, just playing on the decoration pattern, and no need to connect face part eyewear and lens via complex electrical connection since facer part of eyewear is already included in the lens.

The invention claimed is:

1. A method of concealing a non-optically transparent component of an optical article, the method comprising:

providing an optical article comprising:

an optical lens comprising an eyeball side facing an eye of a person when the optical article is worn by the person and an object side opposing the eyeball side, the optical lens comprising on the object side an eyewear shape section extending from an outer contour of the optical lens to an inner contour, wherein the outer contour lies at no greater than an edge of the optical lens and the eyewear shape section lies within a visible region of a surface of the optical lens, and a non-optically transparent component extending at least partly over the eyewear shape section, and concealing the non-optically transparent component by covering at least part of the eyewear shape section of the optical lens using an opaque material, wherein the eyewear shape section comprises a component section being the part of the eyewear shape section faced by the non-optically transparent component upon concealing, and a neighboring section neighboring the component section, and the method further comprising:

covering at least part of the eyewear shape section of the optical lens using an opaque material comprises covering the neighboring section using said opaque material while keeping the component section uncovered by said opaque material, and wherein the opaque material has a substantially similar visual appearance as the non-optically transparent component.

2. The method according to claim 1, wherein, upon concealing the non-optically transparent component, the optical lens is contiguous to the component.

3. The method according to claim 1, wherein, upon concealing the non-optically transparent component, the component is at least partly encapsulated in the optical lens.

4. The method according to claim 1, wherein upon concealing the non-optically transparent component, the optical lens extends beyond the outer contour of the optical lens.

5. The method according to claim 1, wherein, upon concealing the non-optically transparent component, the optical lens is shaped to match the outer contour.

6. The method according to claim 1, further comprising selecting a pattern among a plurality of patterns, and wherein:

covering at least part of the eyewear shape section of the optical lens using an opaque material is performed according to the selected pattern.

7. The method according to claim 1, further comprising selecting an eyewear shape section among a plurality of eyewear shape sections, and wherein:

the eyewear shape section of the provided optical article is the selected eyewear shape section.

8. The method according to claim 1, further comprising obtaining a customized eyewear shape comprising a customized eyewear shape section, and wherein:

the eyewear shape section of the provided optical article is the customized eyewear shape section.

9. The method according to claim 1, wherein the opaque material is ink and covering at least part of the eyewear shape section of the optical lens is performed by inkjet printing.

10. A non-transitory computer-readable medium that stores a computer program comprising one or more stored sequence/s of instructions that is accessible to a processor and which, when executed by the processor, causes the processor to carry out the steps of the method according to claim 1.

11. A system comprising:

processing circuitry connected to a memory and to a communication interface with a concealing device, the processing circuitry being configured instruct the concealing device to cover at least part of an eyewear shape section of an optical lens of an optical article using an opaque material, wherein the optical lens includes an eyeball side facing an eye of a person when the optical article is worn by the person and an object side opposing the eyeball side, the optical lens comprising on the object side an eyewear shape section extending from an outer contour of the optical lens to an inner contour, wherein the outer contour lies at no greater than an edge of the optical lens and the eyewear shape section lies within a visible region of a surface of the optical lens, and a non-optically transparent component extends at least partly over the eyewear shape section, wherein the evewear shape section comprises a component section being the part of the eyewear shape section faced by the non-optically transparent component, and a neighboring section neighboring the component section, wherein the processing circuitry is configured to instruct the concealing device to cover the neighboring section using an opaque material while keeping the component section uncovered by said opaque material, and wherein the opaque material has a substantially similar visual appearance as the non-optically transparent component.

12. An optical article comprising:

an optical lens comprising an eyeball side facing an eye of a person when the optical article is worn by the person and an object side opposing the eyeball side, the optical lens comprising on the object side an eyewear shape section extending from an outer contour of the optical lens to an inner contour, wherein the outer contour lies at no greater than an edge of the optical lens and the eyewear shape section lies within a visible region of a surface of the optical lens, and a non-optically transparent component extending at least partly over the eyewear shape section, wherein at least part of the eyewear shape section of the optical lens is covered with opaque material such that the non-optically transparent component is concealed, wherein the eyewear shape section comprises a component section being the part of the eyewear shape section faced by the non-optically transparent component, and a neighboring section neighboring the component section, wherein the neighboring section is covered with an opaque material while the component section is kept uncovered by said opaque material, and wherein the opaque material has a substantially similar visual appearance as the non-optically transparent component, such that the non-optically transparent component is concealed.

\* \* \* \* \*